United States Patent
Fujio et al.

(10) Patent No.: US 9,921,108 B2
(45) Date of Patent: Mar. 20, 2018

(54) COLOR CONVERSION INFORMATION GENERATING APPARATUS AND METHOD, AND NON-TRANSITORY COMPUTER READABLE MEDIUM

(71) Applicant: FUJI XEROX CO., LTD., Tokyo (JP)

(72) Inventors: Makoto Fujio, Kanagawa (JP); Toshihiro Iwafuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 239 days.

(21) Appl. No.: 14/844,554

(22) Filed: Sep. 3, 2015

(65) Prior Publication Data

US 2016/0273965 A1 Sep. 22, 2016

(30) Foreign Application Priority Data

Mar. 19, 2015 (JP) ................. 2015-056848

(51) Int. Cl.
*G01J 3/46* (2006.01)
*G01J 3/52* (2006.01)

(52) U.S. Cl.
CPC ............. *G01J 3/462* (2013.01); *G01J 3/52* (2013.01)

(58) Field of Classification Search
None
See application file for complete search history.

(56) References Cited

U.S. PATENT DOCUMENTS 8,817,329 B2  8/2014 Satoh et al.

FOREIGN PATENT DOCUMENTS

| JP | 2013-192212 A | 9/2013 |
| JP | 2014-010576 A | 1/2014 |
| WO | 2014/002689 A1 | 1/2014 |

*Primary Examiner* — Michelle Chin
(74) *Attorney, Agent, or Firm* — Oliff PLC

(57) ABSTRACT

A color conversion information generating apparatus includes the following elements. A specific color value obtaining unit obtains a specific color value of a device-dependent color space. A first color element value obtaining unit obtains a first color element value of a device-independent color space by converting the specific color value in accordance with color reproduction characteristics of a display device displaying an image of a subject. A second color element value obtaining unit obtains a second color element value of the device-independent color space by converting a colorimetric value of a color sample which approximates to the specific color value on the basis of a reference value. A generating unit generates, if the first color element value approximates to the second color element value, color conversion information for converting plural color values of the device-dependent color space into plural color values of the device-independent color space.

10 Claims, 8 Drawing Sheets

US 9,921,108 B2

COLOR CONVERSION INFORMATION GENERATING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-056848 filed Mar. 19, 2015.

BACKGROUND

Technical Field

The present invention relates to a color conversion information generating apparatus and method and a non-transitory computer readable medium.

SUMMARY

According to an aspect of the invention, there is provided a color conversion information generating apparatus including the following elements. A specific color value obtaining unit obtains a specific color value of a device-dependent color space, which is dependent on an imaging device imaging a subject. A first color element value obtaining unit obtains a first color element value of a device-independent color space, which is not dependent on a device, by converting the specific color value in accordance with color reproduction characteristics of a display device which displays an image obtained as a result of the imaging device imaging the subject. A second color element value obtaining unit obtains a second color element value of the device-independent color space by setting a reference value and by converting a colorimetric value of a color sample which approximates to the specific color value on the basis of the reference value. A generating unit generates, if the first color element value approximates to the second color element value, color conversion information for converting plural color values of the device-dependent color space obtained as a result of the imaging device imaging plural color samples into plural color values of the device-independent color space. The plural color values of the device-independent color space are obtained by converting colorimetric values of the plural color samples on the basis of the reference value.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below in detail with reference to the accompanying drawings.

[Color Processing System]

Figure 1:
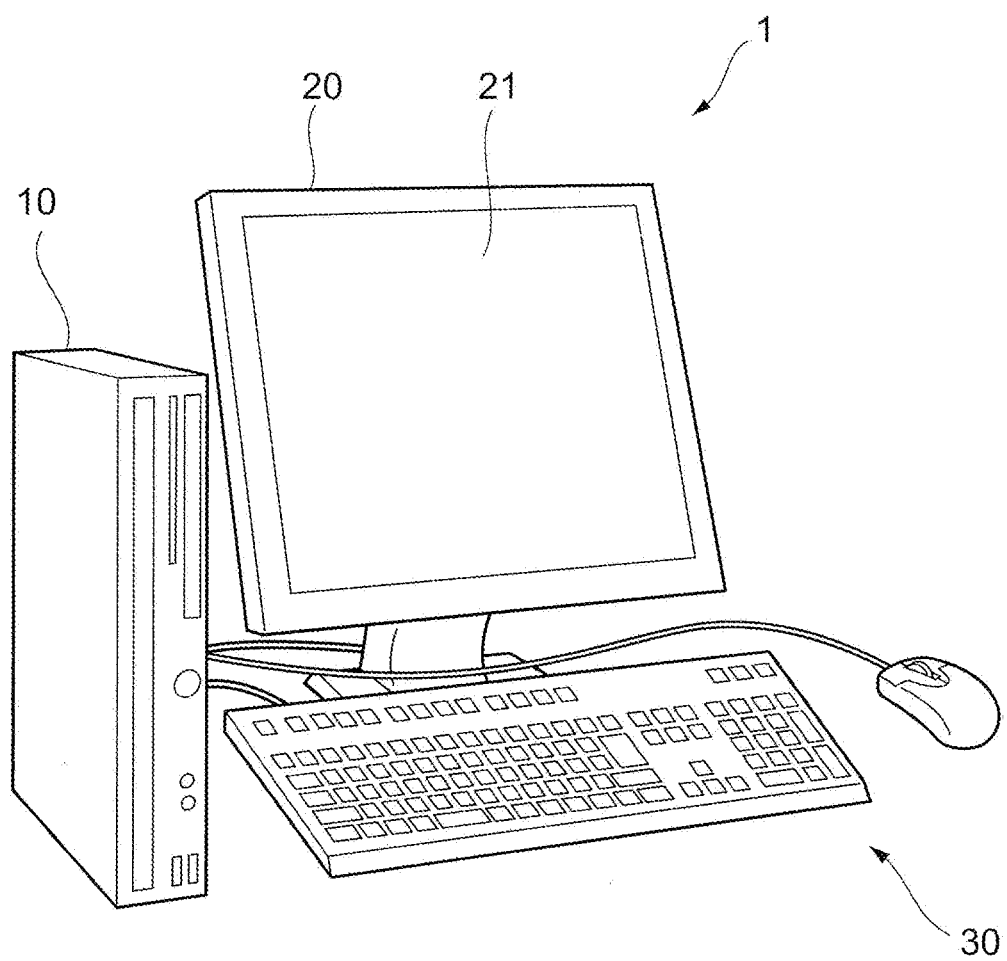
FIG. 1 is a schematic view illustrating an example of the configuration of a color processing system according to an exemplary embodiment of the invention.

FIG. 1 is a schematic view illustrating an example of the configuration of a color processing system 1 according to the exemplary embodiments. As shown in FIG. 1, the color processing system 1 includes a color processing device 10 which performs color processing by using, for example, image information input from a camera, a display device 20 which displays an image on the basis of information input from the color processing device 10, and an input device 30 used by a user to input various items of information into the color processing device 10.

The color processing device 10 is, for example, a general-purpose personal computer (PC). Under the control of an operating system (OS), the color processing device 10 performs color processing by operating various programs, such as application software. A camera and a colorimeter are connectable to the color processing device 10, though they are not shown in FIG. 1.

The display device 20 displays an image on a display screen 21. The display device 20 is constituted by a device having a function of displaying an image by using additive color mixing, such as a liquid crystal display for a PC, a liquid crystal television, and a projector. The display method of the display device 20 is not restricted to the liquid crystal display method. In the example shown in FIG. 1, the display screen 21 is provided within the display device 20. However, if a projector is used as the display device 20, the display screen 21 is, for example, a screen, provided outside of the display device 20.

The input device 30 is constituted by, for example, a keyboard and a mouse. The input device 30 is used to start or quit application software for color processing. The input device 30 is also used to input an instruction into the color processing device 10 when color processing is performed. This will be discussed in detail later.

The color processing device 10 and the display device 20 are connected to each other via, for example, Digital Visual Interface (DVI). Instead of DVI, High-Definition Multimedia Interface (HDMI) (registered trademark) or DisplayPort may be used.

The color processing device 10 and the input device 30 are connected to each other via, for example, a universal serial bus (USB). Instead of a USB, IEEE1394 or RS-232C may be used.

The color processing system 1 of the exemplary embodiments is not restricted to the configuration shown in FIG. 1. For example, a tablet terminal may be used as the color processing system 1. In this case, a tablet terminal includes a touch panel, and an image is displayed on this touch panel and a user instruction is detected by using this touch panel. That is, the touch panel serves as the display device 20 and the input device 30. As a device integrating the display device 20 and the input device 30, a touch monitor may also be used. A touch monitor is a monitor using a touch panel as the display screen 21 of the display device 20. In this case, information is generated in the color processing device 10, and, on the basis of this information, an image is displayed on the touch monitor. A user then touches the touch monitor so as to input an instruction for color processing.

First Exemplary Embodiment

Overview

Figure 2:
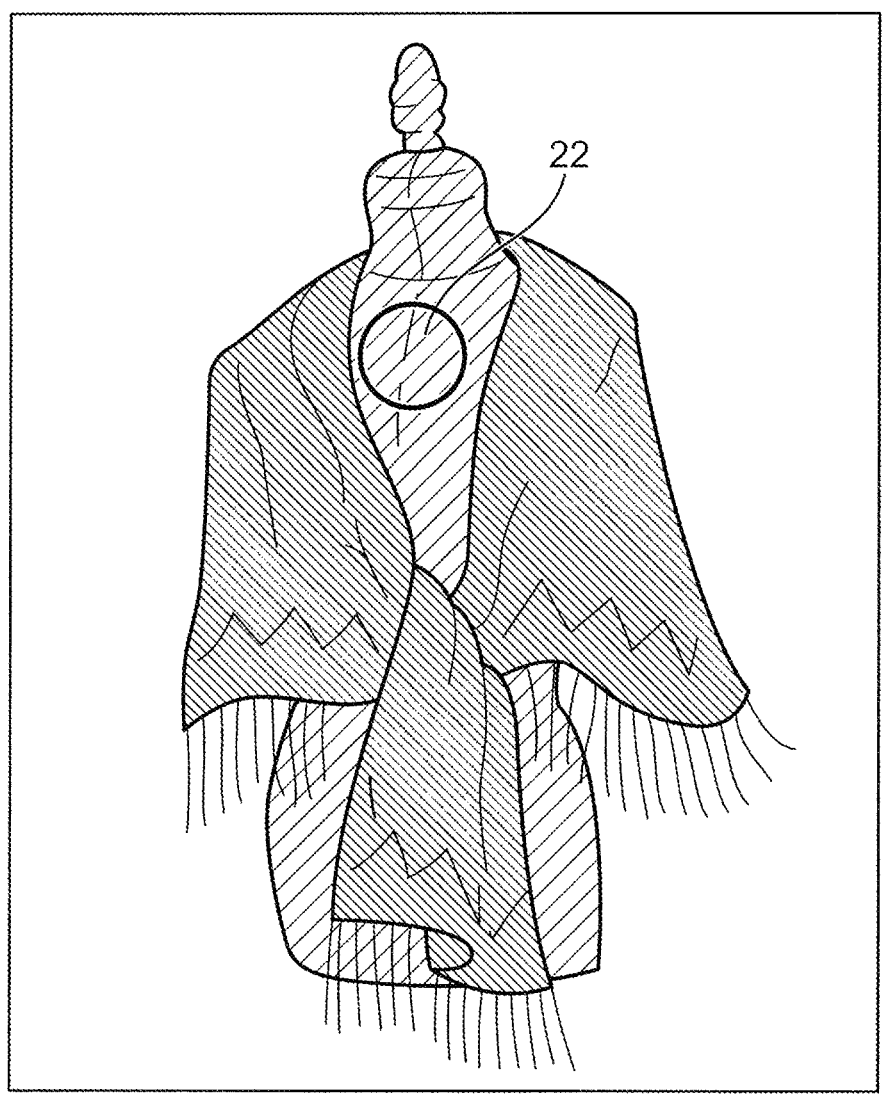
FIG. 2 illustrates a display example of a display screen when a user specifies a color in a first exemplary embodiment.

FIG. 2 illustrates a display example of the display screen 21 when a user specifies a color in a first exemplary embodiment. On the display screen 21 on which an image captured from a product (in this case, a shawl as an example) put on a torso is displayed, a user selects a certain region of the image by using the input device 30, such as a mouse, so as to specify a color to be maintained. In FIG. 2, the user selects a region 22 so as to specify a color in the region 22. Then, the color processing device 10 recognizes that the color of the torso has been specified as a color to be maintained. At the same time, the color processing device 10 recognizes that the color of the product is a color which will not be maintained, but will be corrected.

Figure 3:
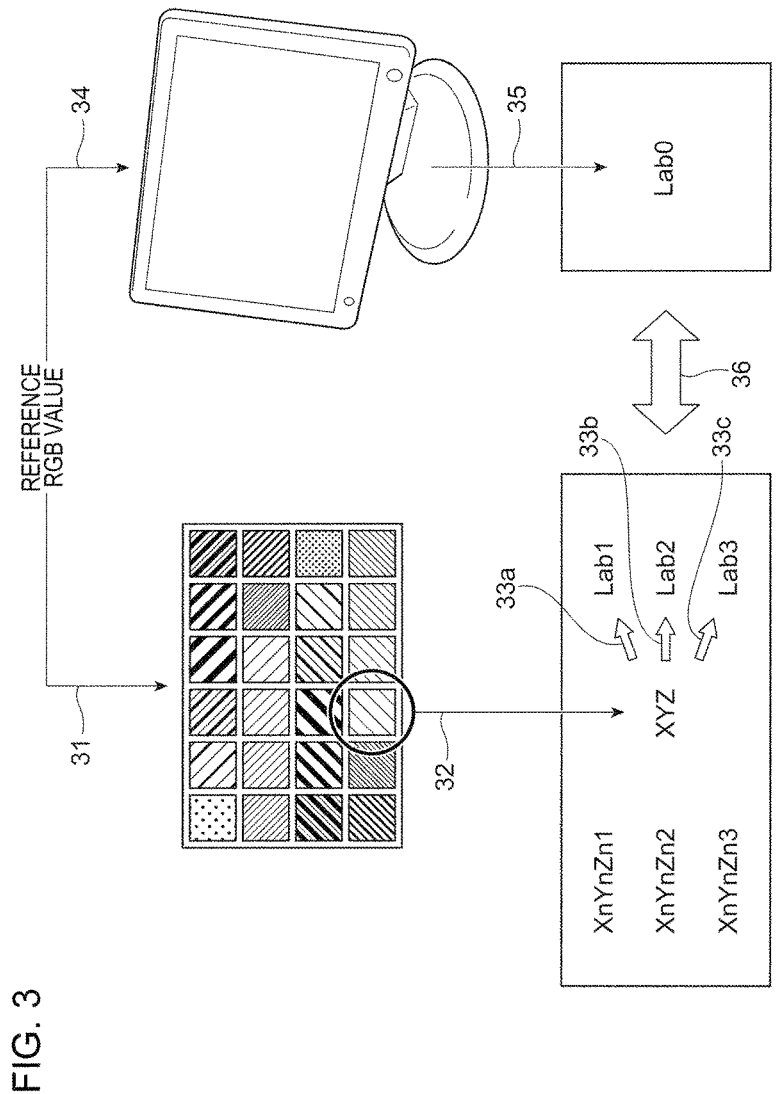
FIG. 3 schematically illustrates an overview of processing performed by a color processing device when a color to be maintained has been specified in the first exemplary embodiment.

FIG. 3 schematically illustrates an overview of processing performed by the color processing device 10 when a color to be maintained has been specified as shown in FIG. 2. It is assumed that the color processing device 10 has obtained the RGB value of a color which has been specified as a color to be maintained (hereinafter such a value will be referred to as a "reference RGB value").

The color processing device 10 compares the reference RGB value with the RGB value of each of the colors included in color patches, as indicated by an arrow 31 of FIG. 1. It is assumed that the RGB value of a color indicated by a circle approximates to the reference RGB value. Then, the color processing device 10 obtains a colorimetric value (XYZ value) of the patch of this RGB value, as indicated by an arrow 32 of FIG. 1. The color processing device 10 then converts the colorimetric value into Lab values by using some white points as reference white points. For example, if the white point is XnYnZn1, the XYZ value is converted into Lab1, as indicated by an arrow 33a. If the white point is XnYnZn2, the XYZ value is converted into Lab2, as indicated by an arrow 33b. If the white point is XnYnZn3, the XYZ value is converted into Lab3, as indicated by an arrow 33c.

The color processing device 10 converts the reference RGB value into a Lab value on the basis of the characteristics of a display which displays an image of a product, as indicated by arrows 34 and 35. It is assumed that the reference RGB value is converted into Lab0.

Then, the color processing device 10 compares each of Lab1, Lab2, and Lab3 with Lab0, and searches for a white point at which each of Lab1, Lab2, and Lab3 approximates to Lab0, as indicated by a double-headed arrow 36. Alternatively, the color processing device 10 may compare the L value of each of Lab1, Lab2, and Lab3 with the L value of Lab0, and may search for a white point at which the L value of each of Lab1, Lab2, and Lab3 approximates to the L value of Lab0. However, a description will be given below, assuming that the Lab value of each of Lab1, Lab2, and Lab3 is compared with that of Lab0. Then, by using the searched white point as a reference white point, a camera profile is generated.

(Configuration of Color Processing Device)

Figure 4:
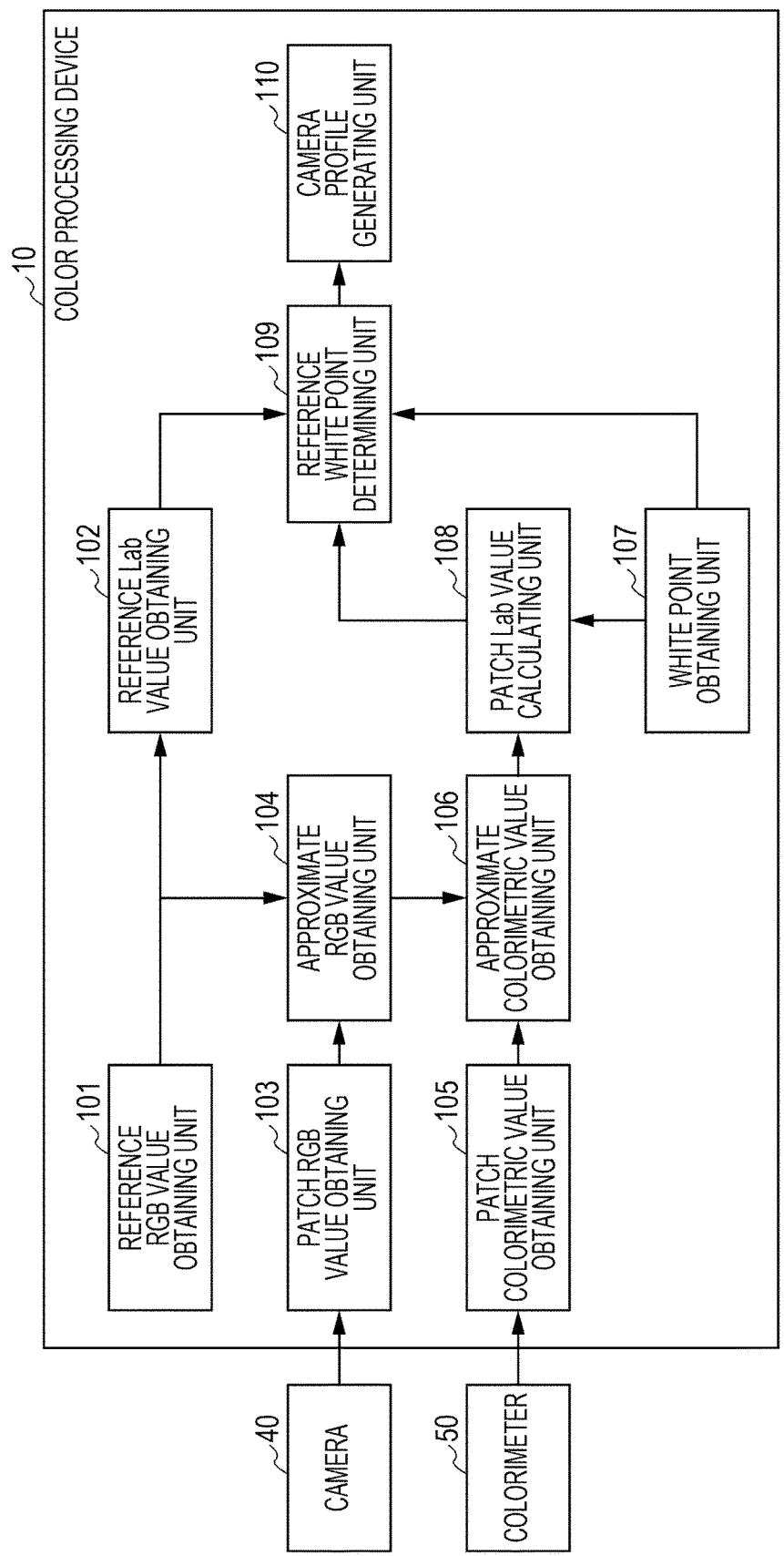
FIG. 4 is a block diagram illustrating an example of the configuration of the color processing device according to the first exemplary embodiment.

FIG. 4 is a block diagram illustrating an example of the configuration of the color processing device 10 according to the first exemplary embodiment. As shown in FIG. 4, the color processing device 10 includes a reference RGB value obtaining unit 101, a reference Lab value obtaining unit 102, a patch RGB value obtaining unit 103, an approximate RGB value obtaining unit 104, a patch colorimetric value obtaining unit 105, an approximate colorimetric value obtaining unit 106, a white point obtaining unit 107, a patch Lab value calculating unit 108, a reference white point determining unit 109, and a camera profile generating unit 110.

In FIG. 4, a camera 40 and a colorimeter 50, which are connectable to the color processing device 10, are also shown though they do not form the color processing device 10. The camera 40 is an example of an imaging device and is used for performing colorimetry of color patches. The colorimeter 50 is an example of a colorimetry device and is used for performing colorimetry of color patches. A color patch is an example of a color sample and will be simply referred to as a "patch".

The individual elements forming the color processing device 10 will be described below in detail.

The reference RGB value obtaining unit 101 obtains the RGB value of a color which will be maintained (reference RGB value). In this case, the reference RGB value may be extracted from an image captured from a product, as shown in FIG. 2. If the reference RGB value is obtained by this approach, the reference RGB value obtaining unit 101 first obtains a captured image from the camera 40 and displays it on the display device 20 (see FIG. 1). Then, when a user specifies a certain region of the captured image, the reference RGB value obtaining unit 101 obtains the RGB value of the color in the specified region as the reference RGB value. Alternatively, the reference RGB value obtaining unit 101 may obtain a numeric value directly input by a user as the reference RGB value. In the exemplary embodiments, an RGB color space is used as an example of a device-dependent color space, and a reference RGB value is used as an example of a specific color value. As an example of a specific color value obtaining unit that obtains a specific color value of a device-dependent color space, the reference RGB value obtaining unit 101 is provided.

The reference Lab value obtaining unit 102 obtains a reference Lab value, which is a Lab value corresponding to the reference RGB value obtained by the reference RGB value obtaining unit 101, from the reference RGB value. In this case, the reference Lab value obtaining unit 102 calculates the reference Lab value by using the color reproduction characteristics of a display which displays an image of a product (for example, the display profile standard of a display profile in the ICC profile or the sRGB standard). In the exemplary embodiments, as an example of a display device, a display which displays an image of a product is used. This display may be different from the display device 20 shown in FIG. 1. As an example of a device-independent color space, a Lab color space is used, and as an example of a first color element value, a reference Lab value is used. As an example of a first color element value obtaining unit that obtains a first color element value of a device-independent color space by converting a specific color value in accordance with the color reproduction characteristics of a display device, the reference Lab value obtaining unit 102 is provided.

The patch RGB value obtaining unit 103 obtains the RGB values of plural patches (hereinafter referred to as "patch RGB values") from an image obtained as a result of the camera 40 imaging plural patches.

The approximate RGB value obtaining unit 104 obtains a patch RGB value which approximates to the reference RGB value obtained by the reference RGB value obtaining unit 101 among the plural patch RGB values obtained by the patch RGB value obtaining unit 103. In this case, "patch RGB value which approximates to the reference RGB value" includes a patch RGB value which is the most approximate to the reference RGB value, or may also include a patch RGB value which is not the most approximate to the reference RGB value but satisfies a predetermined condition for being determined to approximate to the reference RGB value. When the approximate RGB value obtaining unit 104 obtains a patch RGB value which approximates to the reference RGB value, it also obtains identification information (for example, a number) concerning the patch of this approximate patch RGB value. Accordingly, the approximate RGB value obtaining unit 104 informs the approximate colorimetric value obtaining unit 106 of this identification information. In the exemplary embodiments, as an example of an approximate color value, a patch RGB value which approximates to the reference RGB value is used.

The patch colorimetric value obtaining unit 105 obtains colorimetric values of plural patches (hereinafter referred to as "patch colorimetric values") from information obtained as a result of the colorimeter 50 performing colorimetry of plural patches. It is assumed that, as the patch colorimetric values, XYZ values are obtained.

The approximate colorimetric value obtaining unit 106 obtains a patch colorimetric value corresponding to the patch RGB value obtained by the approximate RGB value obtaining unit 104 among the plural patch colorimetric values obtained by the patch colorimetric value obtaining unit 105. Since the approximate RGB value obtaining unit 104 informs the approximate colorimetric value obtaining unit 106 of identification information (for example, a number) concerning the patch of the approximate patch RGB value, the approximate colorimetric value obtaining unit 106 specifies a patch colorimetric value corresponding to the patch RGB value obtained by the approximate RGB value obtaining unit 104, on the basis of this identification information.

The white point obtaining unit 107 obtains plural white points (XnYnZn) and supplies them to the patch Lab value calculating unit 108 and the reference white point determining unit 109. As the white points, white points obtained by imaging the white color of a Lambertian plate or a color chart by changing the imaging angle and the illuminance may be used.

The patch Lab value calculating unit 108 sets each of the plural white points (XnYnZn) supplied from the white point obtaining unit 107 as a reference white point, and calculates plural Lab values (hereinafter referred to as "patch Lab values") corresponding to the patch colorimetric value (XYZ value) obtained by the approximate colorimetric value obtaining unit 106, from the patch colorimetric value (XYZ value). In the exemplary embodiments, as an example of a reference value, a reference white point is used, and as an example of a second color element value, a patch Lab value is used. As an example of a second color element value obtaining unit that obtains a second color element value of a device-independent color space by converting a colorimetric value of a color sample which approximates to a specific color value on the basis of a reference value, the patch Lab value calculating unit 108 is provided.

The reference white point determining unit 109 specifies a patch Lab value which approximates to the reference Lab value obtained by the reference Lab value obtaining unit 102 from among the plural patch Lab values calculated by the patch Lab value calculating unit 108. In this case, "patch Lab value which approximates to the reference Lab value" includes a patch Lab value which is the most approximate to the reference Lab value, or may also include a patch Lab value which is not the most approximate to the reference Lab value but satisfies a predetermined condition for being determined to approximate to the reference Lab value. Then, the reference white point determining unit 109 determines the white point used for calculating the specified patch Lab value as a white point to be set as the reference white point. The reference white point determining unit 109 then instructs the patch Lab value calculating unit 108 to set this white point as the reference white point and to calculate plural patch Lab values corresponding to the plural patch colorimetric values obtained by the patch colorimetric value obtaining unit 105, from the plural patch colorimetric values.

The camera profile generating unit 110 generates a profile of the camera 40 (hereinafter referred to as a "camera profile") by using the white point determined by the reference white point determining unit 109 as the reference white point. More specifically, the camera profile generating unit 110 receives plural patch RGB values from the patch RGB value obtaining unit 103 and also receives, from the patch Lab value calculating unit 108, plural patch Lab values calculated by the patch Lab value calculating unit 108 on the basis of an instruction from the reference white point determining unit 109. Then, the camera profile generating unit 110 generates a camera profile by weighted linear regression by associating the plural patch RGB values with the corresponding plural patch Lab values. In the exemplary embodiments, as an example of color conversion information for converting plural color values of a device-dependent color space into plural color values of a device-independent color space, a camera profile is used. As an example of a generating unit that generates color conversion information, the camera profile generating unit 110 is provided.

(Operation of Color Processing Device)

Figure 5:
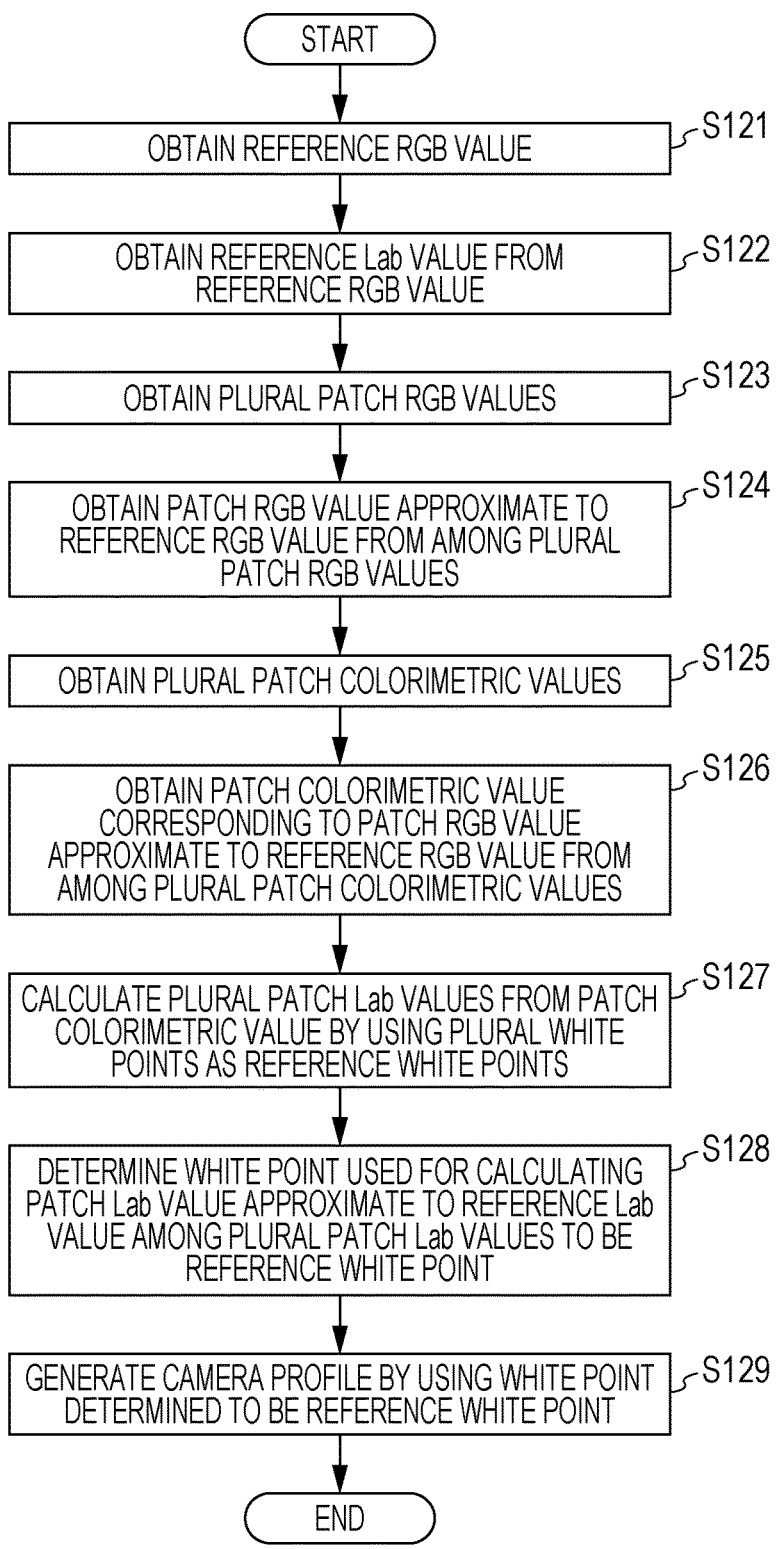
FIG. 5 is a flowchart illustrating an example of the operation performed by the color processing device according to the first exemplary embodiment.

FIG. 5 is a flowchart illustrating an example of the operation performed by the color processing device 10 according to the first exemplary embodiment.

In step S121, in the color processing device 10, the reference RGB value obtaining unit 101 obtains a reference RGB value. Then, in step S122, the reference Lab value obtaining unit 102 obtains a reference Lab value from the reference RGB value obtained in step S121 by using the color reproduction characteristics of a display.

Then, in step S123, the patch RGB value obtaining unit 103 obtains plural patch RGB values. Then, in step S124, the approximate RGB value obtaining unit 104 obtains a patch RGB value which approximates to the reference RGB value obtained in step S121 from among the plural patch RGB values obtained in step S123.

Then, in step S125, the patch colorimetric value obtaining unit 105 obtains plural patch colorimetric values. Then, in step S126, the approximate colorimetric value obtaining unit 106 obtains a patch colorimetric value corresponding to the patch RGB value obtained in step S124 from among the plural patch colorimetric values obtained in step S125.

In step S127, the patch Lab value calculating unit 108 calculates plural patch Lab values corresponding to the patch colorimetric value obtained in step S126 by using each of plural white points supplied from the white point obtaining unit 107 as a reference white point.

Then, in step S128, the reference white point determining unit 109 determines the white point used for calculating the patch Lab value which approximates to the reference white Lab value obtained in step S122 from among the plural patch Lab values calculated in step S127 to be a reference white point. In step S129, the camera profile generating unit 110 generates a camera profile by using the white point determined to be the reference white point in step S128.

Second Exemplary Embodiment

Overview

Figure 6:
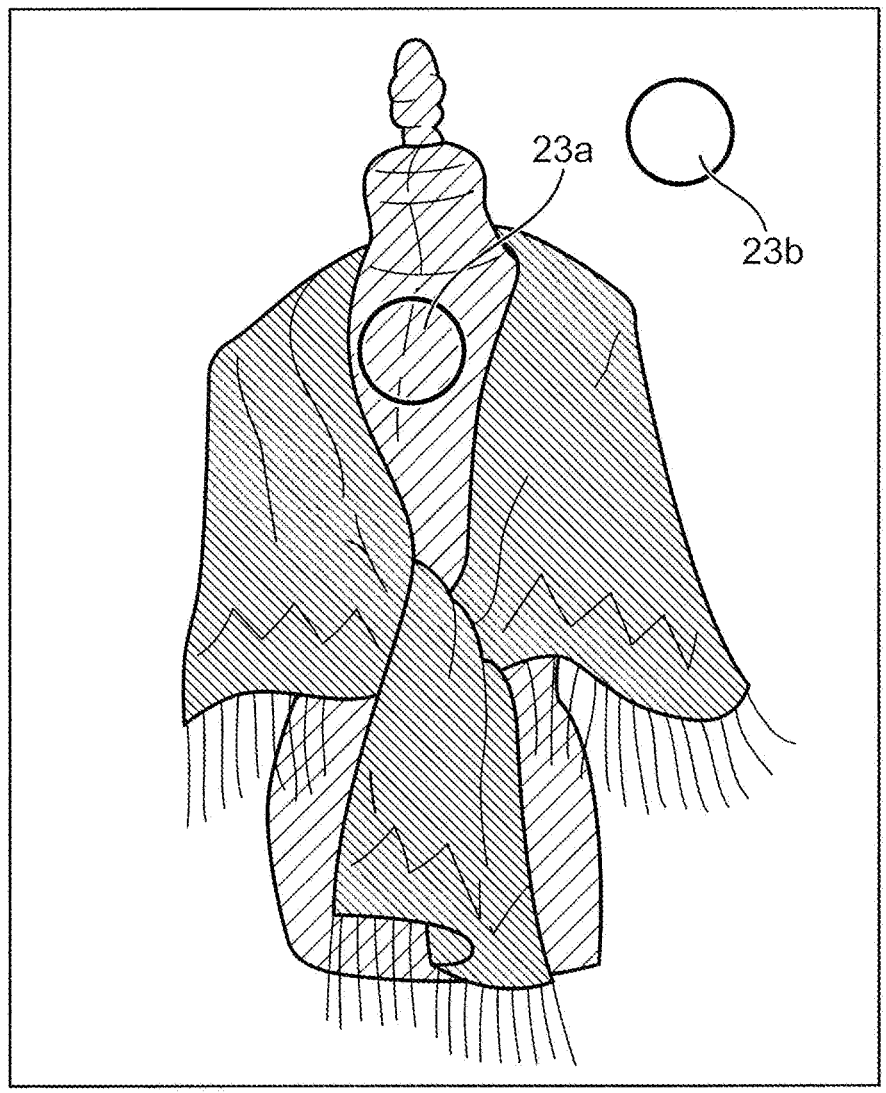
FIG. 6 illustrates a display example of a display screen when a user specifies colors in a second exemplary embodiment.

FIG. 6 illustrates a display example of the display screen 21 when a user specifies colors in a second exemplary embodiment. In the first exemplary embodiment, a user specifies one color. In the second exemplary embodiment, a user specifies plural colors. On the display screen 21 on which an image captured from a product (in this case, a shawl as an example) put on a torso is displayed, a user selects plural regions so as to specify plural colors by using the input device 30, such as a mouse. In FIG. 6, the user selects regions 23a and 23b so as to specify plural colors. Then, the color processing device 10 recognizes that, not only the color of the torso, but also the color of the background, has been specified.

If plural colors are specified, as shown in FIG. 6, generally, it is difficult for the color processing device 10 to determine a white point used as a reference white point for each of the plural colors by performing processing shown in FIG. 3 so that the determined white points are fairly suitable for all the plural colors. In this case, therefore, the Lab values of each of the plural colors indicated in the left side of FIG. 3 and the Lab value of each of the plural colors indicated in the right side of FIG. 3 are determined, and a white point used as a reference white point is determined so that the relations of the Lab values in the left side between the plural colors and the relations of the Lab value in the right side between the plural colors can be maintained.

Figure 7:
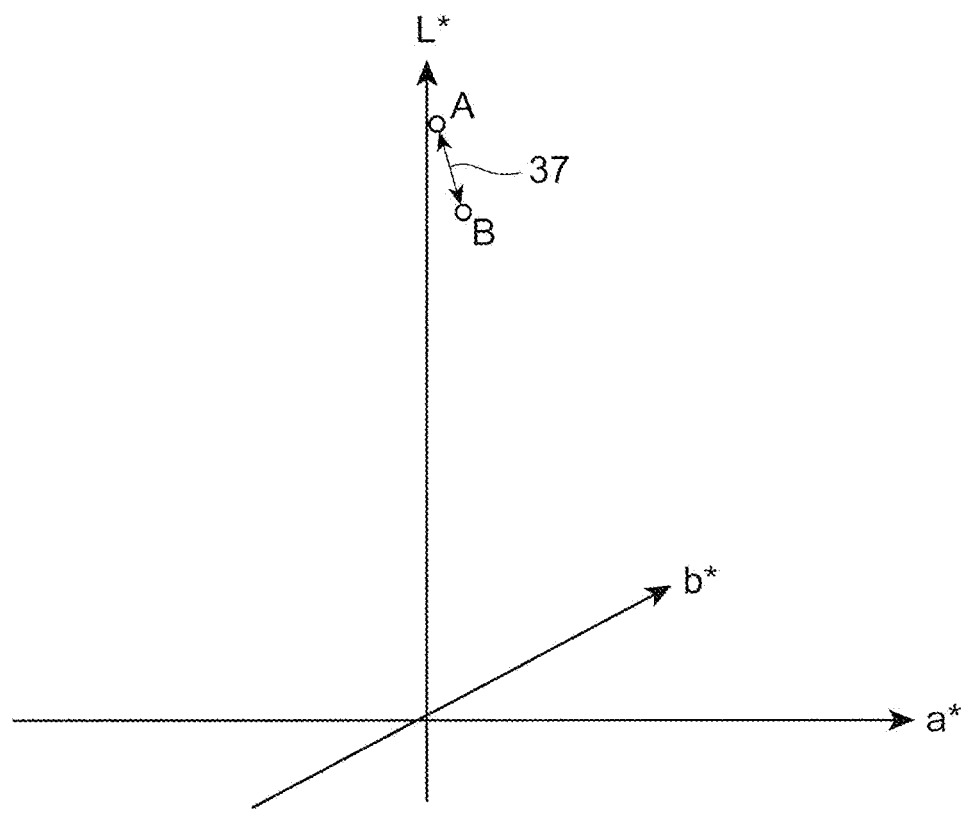
FIG. 7 is a diagram for explaining an approach to determining a reference white point in the second exemplary embodiment.

FIG. 7 is a diagram for explaining an approach to determining a reference white point as described above. In FIG. 7, the color specified in the region 23a is indicated by A and the color specified in the region 23b is indicated by B, and the colors A and B are shown within a Lab color space. In this case, the color processing device 10 determines a white point used as a reference white point so that the relations between the color A and the color B indicated by a double-headed arrow 37 in the Lab color space can be maintained. The relations between the color A and the color B are, for example, differences between the elements of the color A and the elements of the color B. That is, the relations between the color A and the color B may be a difference in the lightness between the color A and the color B, a difference in the hue between the color A and the color B, a difference in the saturation between the color A and the color B, a difference in the L* value between the color A and the color B, a difference in the a* value between the color A and the color B, and a difference in the b* value between the color A and the color B.

(Configuration and Operation of Color Processing Device)

The configuration of the color processing device 10 according to the second exemplary embodiment is substantially the same as that of the first exemplary embodiment shown in FIG. 4. However, the content of processing performed by some elements forming the color processing device 10 may be different from that of the associated elements of the first exemplary embodiment. This will be discussed below. The reference RGB value obtaining unit 101 obtains N (N≥2) reference RGB values. In accordance with this processing by the reference RGB value obtaining unit 101, the reference Lab value obtaining unit 102 obtains N reference Lab values, the approximate RGB value obtaining unit 104 obtains N patch RGB values, the approximate colorimetric value obtaining unit 106 obtains N patch colorimetric values, and the patch Lab value calculating unit 108 calculates N patch Lab values with respect to one white point. Then, the reference white point determining unit 109 determines a white point used as a reference white point so that the relations of the N reference Lab values obtained by the reference Lab value obtaining unit 102 and the relations of the N patch Lab values calculated by the patch Lab value calculating unit 108 can be maintained.

The operation of the color processing device 10 according to the second exemplary embodiment is substantially the same as that of the first exemplary embodiment shown in FIG. 5. However, the content of processing in some steps may be different from that of the associated steps in the first exemplary embodiment. This will be discussed below. In step S121, N (N≥2) reference RGB values are obtained. In accordance with the processing in step S121, in step S122, N reference Lab values are obtained, in step S124, N patch RGB values are obtained, in step S126, N patch colorimetric values are obtained, in step S127, N patch Lab values are calculated with respect to one white point, and then, in step S128, a white point used as a reference white point is determined so that the relations of the N reference Lab values obtained in step S122 and the relations of the N patch Lab values calculated in step S127 can be maintained.

Modified Examples

In the above-described exemplary embodiments, white points used by the patch Lab value calculating unit 108 and a white point determined to be a reference white point by the reference white point determining unit 109 are defined by XnYnZn. However, the definition of a white point is not restricted to XnYnZn. A white point may be defined by Yn. As discussed above, for generating a camera profile, the patch Lab value calculating unit 108 calculates plural patch Lab values from plural patch colorimetric values by using white points. In this case, the white points used by the patch Lab value calculating unit 108 also need Xn and Zn. Xn and Zn may be obtained by one of the following methods. In a first method, the ratio of XnYnZn is obtained from the value of the color temperature of an imaging light source, and Xn and Zn are calculated from this ratio and Yn. In a second method, a white reference plate is subjected to non-contact colorimetry under an imaging light source from different angles. Then, the ratio of XnYnZn is obtained from two or more resulting colorimetric values, and Xn and Zn are calculated from this ratio and Yn.

In the above-described exemplary embodiments, the reference white point determining unit 109 selects one white point from among plural white points used by the patch Lab value calculating unit 108, and sets the selected white point as a reference white point. However, this is only an example. The reference white point determining unit 109 may select two or more white points from among the plural white points used by the patch Lab value calculating unit 108. Then, the reference white point determining unit 109 may average the selected white points and determine the average value to be a reference white point.

In the above-described exemplary embodiments, when the patch Lab value calculating unit 108 calculates plural patch Lab values from plural patch colorimetric values, reference white points are used. However, reference points other than reference white points may be used.

[Hardware Configuration of Color Processing Device]

Figure 8:
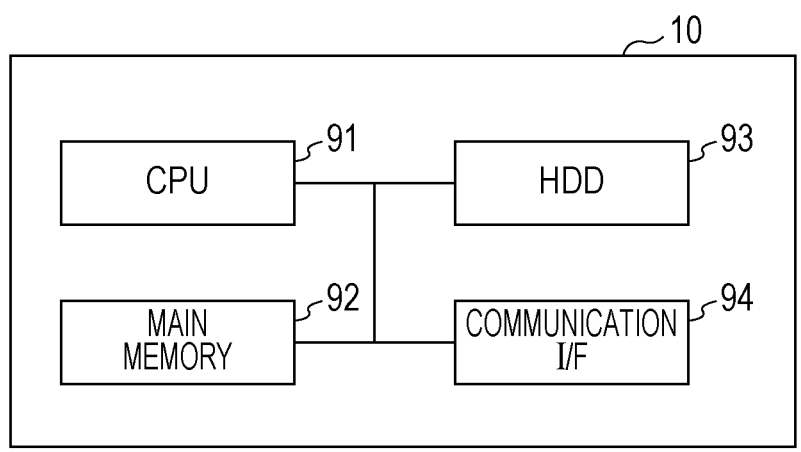
FIG. 8 is a block diagram illustrating an example of the hardware configuration of a color processing device according to an exemplary embodiment of the invention.

FIG. 8 is a block diagram illustrating an example of the hardware configuration of the color processing device 10. The color processing device 10 is implemented by, for example, a PC, as discussed above. As shown in FIG. 8, the color processing device 10 includes a central processing unit (CPU) 91, which serves as a processor, a main memory 92, which serves as a storage unit, and a hard disk drive (HDD) 93. The CPU 91 executes various programs, such as an OS and application software. The main memory 92 stores therein various programs and data used for executing such programs. The HDD 93 stores therein data input into various programs and data output from various programs. The color processing device 10 also includes a communication interface (communication I/F) 94 for performing communication with an external source.

[Program]

Processing performed by the color processing device 10 in the above-described exemplary embodiments is prepared as a program, such as application software.

Accordingly, processing performed by the color processing device 10 may be realized as a program causing a computer to implement: a function of obtaining a specific color value of a device-dependent color space, which is dependent on an imaging device imaging a subject; a function of obtaining a first color element value of a device-independent color space, which is not dependent on a device, by converting the specific color value in accordance with color reproduction characteristics of a display device which displays an image obtained as a result of the imaging device imaging the subject; a function of obtaining a second color element value of the device-independent color space by setting a reference value and by converting a colorimetric value of a color sample which approximates to the specific color value on the basis of the reference value; and a function of generating, if the first color element value approximates to the second color element value, color conversion information for converting plural color values of the device-dependent color space obtained as a result of the imaging device imaging plural color samples into plural color values of the device-independent color space, the plural color values of the device-independent color space being obtained by converting colorimetric values of the plural color samples on the basis of the reference value.

The program implementing the exemplary embodiments may be provided by using a communication medium, or may be stored in a recording medium, such as a compact disc-read only memory (CD-ROM), and be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion information generating apparatus comprising:
   a processor programmed to:
      obtain a specific color value of a device-dependent color space, which is dependent on an imaging device imaging a subject;
      obtain a first color element value of a device-independent color space, which is not dependent on a device, by converting the specific color value in accordance with color reproduction characteristics of a display device which displays an image obtained as a result of the imaging device imaging the subject;
      obtain a second color element value of the device-independent color space by:
         setting a reference value; and
         converting a colorimetric value of a color sample which approximates to the specific color value on the basis of the reference value;
      compare the first color element value to the second color element value to determine whether the first color element value approximates to the second color element value; and
      generate, upon a determination that the first color element value approximates to the second color element value, color conversion information for converting a plurality of color values of the device-dependent color space, the plurality of color values being obtained:
         as a result of the imaging device imaging a plurality of color samples into a plurality of color values of the device-independent color space; and
         by converting colorimetric values of the plurality of color samples on the basis of the reference value.

2. The color conversion information generating apparatus according to claim 1, wherein the processor is programmed to:
   obtain a colorimetric value of a color sample which approximates to the specific color value by:
      selecting an approximate color value which approximates to the specific color value from among the plurality of color values of the device-dependent color space obtained as a result of the imaging device imaging the plurality of color samples; and
      selecting a colorimetric value of a color sample corresponding to the selected approximate color value from among the colorimetric values of the plurality of color samples.

3. The color conversion information generating apparatus according to claim 1, wherein the processor is programmed to obtain, as the specific color value, a color value of a color in a region of an image of the subject specified by an operator.

4. The color conversion information generating apparatus according to claim 1, wherein the processor is programmed to obtain, as the specific color value, a color value having a numeric value input by an operator.

5. The color conversion information generating apparatus according to claim 1, wherein the processor is programmed to:
   obtain, as the first color element value, a value of lightness of a first color in the device-independent color space; and obtain, as the second color element value, a value of lightness of a second color in the device-independent color space.

6. The color conversion information generating apparatus according to claim 1, wherein the processor is programmed to:
obtain, as the first color element value, values of all components of a first color in the device-independent color space; and
obtain, as the second color element value, values of all components of a second color in the device-independent color space.

7. The color conversion information generating apparatus according to claim 1, wherein the processor is programmed to:
set a value of lightness as the reference value;
obtain the second color element value of the device-independent color space by converting a colorimetric value of a color sample which approximates to the specific color value on the basis of the value of lightness; and
generate the color conversion information for converting the plurality of color values of the device-dependent color space obtained as a result of the imaging device imaging the plurality of color samples into a plurality of color values of the device-independent color space, the plurality of color values of the device-independent color space being obtained by setting a value other than the value of lightness as the reference value and by converting the colorimetric values of the plurality of color samples on the basis of the value of lightness and the value other than the value of lightness.

8. The color conversion information generating apparatus according to claim 1, wherein the processor is programmed to:
obtain a plurality of specific color values of the device-dependent color space;
obtain a plurality of first color element values of the device-independent color space by converting the plurality of specific color values in accordance with the color reproduction characteristics of the display device;
obtain a plurality of second color element values of the device-independent color space by:
setting the reference value; and
converting colorimetric values of color samples which approximate to the plurality of specific color values on the basis of the reference value; and
generate the color conversion information if a difference between the plurality of first color element values approximates to a difference between the plurality of second color element values.

9. A color conversion information generating method comprising:
obtaining a specific color value of a device-dependent color space, which is dependent on an imaging device imaging a subject;
obtaining a first color element value of a device-independent color space, which is not dependent on a device, by converting the specific color value in accordance with color reproduction characteristics of a display device which displays an image obtained as a result of the imaging device imaging the subject;
obtaining a second color element value of the device-independent color space by:
setting a reference value; and
converting a colorimetric value of a color sample which approximates to the specific color value on the basis of the reference value;
comparing the first color element value to the second color element value to determine whether the first color element value approximates to the second color element value; and
generating, upon a determination that the first color element value approximates to the second color element value, color conversion information for converting a plurality of color values of the device-dependent color space, the plurality of color values being obtained:
as a result of the imaging device imaging a plurality of color samples into a plurality of color values of the device-independent color space; and
by converting colorimetric values of the plurality of color samples on the basis of the reference value.

10. A non-transitory computer readable medium storing a program causing a computer to execute a process, the process comprising:
obtaining a specific color value of a device-dependent color space, which is dependent on an imaging device imaging a subject;
obtaining a first color element value of a device-independent color space, which is not dependent on a device, by converting the specific color value in accordance with color reproduction characteristics of a display device which displays an image obtained as a result of the imaging device imaging the subject;
obtaining a second color element value of the device-independent color space by:
setting a reference value; and
converting a colorimetric value of a color sample which approximates to the specific color value on the basis of the reference value;
comparing the first color element value to the second color element value to determine whether the first color element value approximates to the second color element value; and
generating, upon a determination that the first color element value approximates to the second color element value, color conversion information for converting a plurality of color values of the device-dependent color space, the plurality of color values being obtained:
as a result of the imaging device imaging a plurality of color samples into a plurality of color values of the device-independent color space; and
by converting colorimetric values of the plurality of color samples on the basis of the reference value.

* * * * *